US006879895B2

(12) United States Patent
Capps et al.

(10) Patent No.: US 6,879,895 B2
(45) Date of Patent: Apr. 12, 2005

(54) METHOD AND HANDLING APPARATUS FOR A VEHICULAR ELECTRICAL SYSTEM

(76) Inventors: Rick W. Capps, P.O. Box 1420, Fernley, NV (US) 89408; Stephen V. Diebel, 1888 Dutchman Dr., Sparks, NV (US) 89434; John A. Ridyard, 880 McLean, Fallon, NV (US) 89406

( * ) Notice: Subject to any disclaimer, the term of this patent is extended or adjusted under 35 U.S.C. 154(b) by 0 days.

(21) Appl. No.: 10/421,339

(22) Filed: Apr. 22, 2003

(65) Prior Publication Data

US 2003/0200017 A1 Oct. 23, 2003

Related U.S. Application Data

(60) Provisional application No. 60/374,915, filed on Apr. 23, 2002.

(51) Int. Cl.[7] .................................................. G06F 7/00
(52) U.S. Cl. .......................... 701/36; 701/53; 180/6.28; 340/853.2
(58) Field of Search ............................... 701/1, 33, 36, 701/49, 53; 180/174, 6.28; 340/853.2

(56) References Cited

U.S. PATENT DOCUMENTS 6,624,611 B2 * 9/2003 Kirmuss ..................... 320/104

* cited by examiner

Primary Examiner—Gertrude A. Jeanglaude
(74) Attorney, Agent, or Firm—Dean A. Craine

(57) ABSTRACT

An apparatus used in a motor vehicle that provides load prioritization, load shedding, start sequencing and support of ultra or super capacitors when coupled to the motor vehicle's electrical power source and distribution network. The apparatus includes circuit Breakers, Solid State Relays, Controller Area Network (CAN) physical, transport and logical interface which enables the apparatus to connect or interface with power sources and to the vehicle's multiplex bus. The apparatus also includes decision, threshold detection and operational awareness logical software functions that enable it to prioritize power between the vehicles electrical components and interrogative/processing software functions that enable the apparatus to diagnosis abnormalities and communication status information to the vehicle operator. Lastly, the apparatus includes DC converters, temperature compensation circuitry, solid state relays, logic drivers and software functions that allow load shedding and temperature compensation to maintain efficient operation of the power source.

13 Claims, 5 Drawing Sheets

METHOD AND HANDLING APPARATUS FOR A VEHICULAR ELECTRICAL SYSTEM

This utility patent application is based on the provisional patent application (Ser. No. 60/374,915) filed on Apr. 23, 2002.

BACKGROUND OF THE INVENTION

1. Field of the Invention

The present invention relates to the field of computerized electrical busses that connect and integrate a vehicle's electrical power supply with various devices and aspects of the vehicle. In particular, the invention applies to those vehicles which feature an internal combustion engine (ICE) powertrain or a main propulsion unit associated with a battery-based, battery-capacitor based, fuel cell-based, solar cell reactor-based or capacitor-based electrical power generation/storage source.

2. Description of the Related Art

In the first manifestation of vehicles powered by an internal combustion engine (ICE), such as the automobile, train, airplane, submarine and the like, electrical power played an important part in the functioning of the ICE powertrain. At first, electrical power was generated to provide the electric spark that was needed to start and/or run the ICE that propelled the vehicle. As ICE-based vehicles developed, electricity was also used to power the various auxiliary devices associated with the vehicle, such as lights, gauges, radio and the like.

Initially, the vehicular electrical devices were very limited in the amount of information that they could carry and process and are now considered to be "dumb" devices or systems. The "dumb" vehicular electrical devices and systems use two types of signals: analogue and digital. A digital signal-based electrical device/system is the simpler of the two "dumb" systems. The digital electrical signals are simply an "on-off" electrical signals that are communicated by the presence of, or lack thereof, an electrical current or charge in the electrical system. Such digital signals are generated by devices like simple car door switch which is used to indicate when a car door is opened or closed, or by simple light switches which turn on or off corresponding lights.

The other "dumb" electrical system is based on the analogue signal. Whereas the digital electrical systems and devices utilize the presence or absence of an electrical charge or current, the analogue signal uses the change in the amount of voltage of the electrical charge, rather than a presence of, or lack thereof, an electrical current or charge. In this manner, the analogue signal is used to communicate varying degrees of change as noted by an analogue electrical sensor.

One example of an analogue electrical system is the fuel level sensor of the vehicle's fuel tank and correspondingly, the fuel gauge on the instrument panel in the passenger compartment. The fuel level sensor has a pivoting arm to which a float is attached to the far end of the arm. The fuel level sensor is positioned into the fuel tank so that the arm can allow the float to pivot freely on the top of the fuel in the tank and will correspondingly move the arm as fuel is added or removed from the fuel tank.

When the vehicle is running, its ICE powertrain consumes fuel, and correspondingly, the level of fuel decreases in the fuel tank. As the fuel sensor float in the fuel tank drops with the decreasing level of gasoline in the fuel tank, this will cause the fuel level sensor to change the amount of electrical current (e.g., change the voltage level or the level of the electrical current) that it is sending to the fuel gauge mounted on the vehicle's instrument panel. The fuel gauge, reading the analogue electrical signal (the amount of electricity coming from the fuel tank fuel level sensor) and converts it into a fuel level reading displayed on the fuel gauge.

The analogue electrical signal, as it relates to the displayed information of the fuel gauge, is converted by the gauge is shown as follows (example):

No electrical charge from the sensor—empty gas tank reading;

Small electrical charge from sensor—$V_4$ gas tank reading;

Greater electrical charge from sensor—$V_2$ gas tank reading, etc.

Other types of analogue signal-based electrical devices include engine temperature gauges and sensors (i.e. cold, warm, very warm, hot, too hot).

These analogue and digital based electrical signals, when transmitted between various vehicle electrical devices, have been traditionally carried by a cumbersome wiring harness comprised of multiple pairs of wires. Generally speaking, each "dumb" electrical device has its own separate and distinct wire pair to connect the "dumb" device to power supply and/or control features and/or other "dumb" devices.

Generally speaking, a wire pair for a "dumb" electrical device has at least one (1) specific wire to supply electricity to the device and at least one (1) specific wire to take electricity away from the device or to ground the device. A vehicle having multiple electrical devices that are based either on analogue and digital signals will have a wiring harness that is comprised of a multitude of such wire pairs. Such "dumb" wiring harnesses for electrically/electronically sophisticated vehicles such as passenger cars are cumbersome to deal with because of their harnesses' complexity which make the harnesses difficult to build, install, maintain and repair. Further, such complexity in a wiring harness can also result in unreliable vehicular electrical system, even to the point of causing serious vehicular electrical problems, such as, total electrical failure, or in some instances, vehicle fires.

During the latter portion of the twentieth-century, with the dawning of the computer revolution, many vehicular electrical devices were designed and manufactured to be computer chip controlled. The computer revolution facilitated the development of advanced sophisticated vehicular electrical/electronic devices (solid state and/or computer chip enhanced) that could handle high speed processing of large amounts of information or data.

An example of this "smart" electronic technology is known as the SAE (Society of Automotive Engineering) J1939 or CAN (Controller Area Network) 2.OB system. This system, which has an industry accepted uniform set of standards and criteria, is used primarily in commercial or military motor vehicles for their "smart" electronic systems. Example of Ji 939/CAN 2.OB "smart" devices for commercial vehicles includes: ABS (automatic brake system); fuel injection/turbo-super charged engines, electrically controlled automatic transmissions, airbag systems; automatic interior environmental control; pollution control equipment; and other types of non-mechanical/operate-by-wire instrumentalities.

The J1939 system uses a wiring harness comprised of a single wire pair that connects all the "smart" vehicular devices together. The J1939 system utilizes a differential voltage current to transmit/receive serial stream messages or signals between all the "smart" electronic devices located on the "smart" wire harness. The use of differential voltage and serial stream messages allows a great amount of information or data to be carried throughout the J1939 system and allow the "smart" electrical system to tolerate (ignore) any electrical interference (noise) that radiate the J1939 wiring harness.

The serial stream messages are electronic signals that have bits of information or data that are encoded or "compartmentalized" into different segments of the signal itself. In this manner, for example, the first part or segment of the serial stream signal could contain identifier information telling the intended recipient "smart" device that this message was an incoming signal for it alone. The second part of the serial stream signal could contain data as to what specific action the intended recipient "smart" device was to take. A third part section of the signal might contain data that the intended recipient "smart" device was to utilize when it undertook the requested action.

A "smart" device therefore that used serial stream message technology would have the ability to transmit, receive and process a significantly large amount of information to handle increasingly sophisticated and complex tasks than could the analogue or digital "dumb" devices. The utilization of this "smart" communication and processing means would allow the replacement of mechanical-based control (with its limited speed and information capability) with operate-by-wire technology and its greatly enhanced speed and task management capability.

The "smart" system does have its limitations. First, it is incompatible with "dumb" electrical devices in that "dumb" devices lack the ability to receive, process or transmit serial stream messages. Further, the direct connection of a "dumb" electrical device to a smart wiring harness would interfere with the differential voltage used on the "smart" wiring harness and cause a breakdown or failure of the "smart" device network.

A current example of "smart" technology in a vehicle is seen in the ABS or Antilock Braking System for commercial vehicles. The ABS, utilizing several sensors located throughout the vehicle, sends a continuous stream of a large amount of information on how the vehicle is operating to the computerized controller of the ABS. This constant massive flow and processing of information allows, when the car's external environment requires the driver to commence braking of the vehicle, the ABS "smart" system to act faster in braking (without locking the wheels) the vehicle relative to actual driving conditions than could the vehicle operator in utilizing the old manual mechanical operation of a non-ABS brake system.

It is possible, that in the future, all of a vehicle's electrical and electronic devices will be "smart" technology compatible. It is possible that the "dumb" (analogue/digital) electrical devices will have a "gateway" type chip in them that will allow the "dumb" devices to be integrated with the "smart" electronic system. The "gateway" chip will allow the "dumb" device to receive, process and transmit serial stream messages allowing for computerized control of a previously "dumb" device. The "gateway" chip, in addition to providing the above-described computerized control, will allow the "dumb" electrical device to sending of messages regarding its performance or status to the control panel or controlling computer that in turn will notify the vehicle operator of such status.

This future affording of the "dumb" devices with full "smart" compatibility and capability will allow the greatly expanded capacity of "dumb" (analogue/digital) devices. An example of this future development would be headlights of a vehicle. In addition to the ordinary switching on-and-off of the headlights, a vehicle's computer (with this "gateway" chip installed on the headlight bulb) could allow instantaneous computerized control of the intensity and direction of a single headlight to correspond to the lighting conditions on that headlight's side of the road.

Until that time occurs when vehicles have fully integrated "smart" capability and corresponding manufacturing industry imposes universally accepted standards for such capability, the vehicle manufacturers and their suppliers will continue to make vehicles which have separate "smart" and "dumb" electrical systems running side-by-side. The current situation is very similar to having a computer network running along side a communication system that comprises of tin cans connected by a string.

Further, a vehicle which does not have full integration of its electrical/electronic systems cannot take advantage of the multiple benefits of the "smart" computerized electrical system. There is also associated with this non-integration, the price of increased cost for the vehicle's electrical system that accommodates both "smart" and dumb" electrical/electronic devices and systems. Such an accommodation requires duplicate manufacture, installation, and maintenance/repair costs as well as having a separate "dumb" wiring harness that is still cumbersome, complex and heavy.

Outside of the above-stated manufacturing situation, there is also the worldwide concern about increasing amounts of emission pollution resulting from the operation of internal combustion engines (ICE). As these concerns continue to grow, governments worldwide are imposing greater restrictions and stricter mandates on vehicle manufacturers to limit or reduce the amount of pollutants that an internal combustion engine powertrain can emit.

To meet these ever-increasing restrictions and mandates, the vehicle manufactures are turning towards other means of propulsion to supplement or even replace the ICE vehicle power plant. Such supplantation includes the utilization of solar power, electrical energy stored by very powerful capacitors, hydrogen-powered fuel cells, wireless energy transmitting grid (e.g. microwave radiation) and other futuristic propulsion systems. With such new power systems will come electrical/electronic systems that have standards that are different from the current vehicular electrical systems to add to the already confusing state of affairs of electrical/electronic standards and systems integration. These new systems will include electrical power source/storage systems (battery-based, battery/capacitor hybrid-based, capacitor-based, fuel cell, solar cell reactors and other advances in energy storage technology) that are used in conjunction with various vehicle powertrains and their various hybrid combinations.

As shown above, the incompatibly of vehicle's electrical and electronic systems is a current and future problem. There is, therefore, a present and future need for a means of integration and coordination of the various types of electrical/electronic "dumb" (digital, analogue) and "smart" systems of a vehicle.

At the very minimum, this integration and coordination should occur without regard to the type of electrical power/storage source that the vehicle utilizes. Further, this integration and coordination solution should occur on at least three different levels for the operation of the vehicle's electrical/electronic system: 1) start-up control, 2) electrical load management and 3) electrical load shedding.

The first level, start-up control, is where all electrical systems which are not needed to initiate or start the propulsion unit or the powertrain of the vehicle, are shut down or set to minimal energy requirements so that all the energy for the vehicle's power source/storage can be devoted in starting or initializing the propulsion unit/powertrain of the vehicle. Additionally in this level switching of power sources to the start up device can be accomplished.

The second level, electrical load management, is devoted to decide what available electrical power from the vehicle should go to what electronic/electrical device(s) or system(s). This level of management also monitors the amount of electrical activity and status of the respective electronic/electrical devices and systems.

The third level is load-shedding management which is the decision-making process and control for prioritizing, according to task or need at hand, which electronic/electrical devices/systems should be powered and which should be de-energized to a lower level of power consumption or turned-off completely. This level of management helps prevents unnecessary depletion of the vehicle's electrical power source/storage and promotes energy conservation.

There is therefore a need for a computerized management apparatus and methodology that can integrate both electronic/electrical "dumb" and "smart" systems of a vehicle on the three levels of starting control, load management and load shedding for a vehicle's electronic/electrical system(s).

SUMMARY OF THE INVENTION

It is an object of the invention to prioritize the electrical loads during an automated and selective shut down of the vehicle's electrical/electronic systems.

It is an object of the invention to provide a diagnosis capability for an electronic/electrical system of a vehicle.

It is an object of the invention to prioritize electrical/electronic loads to protect the electrical power supply needed to start the powertrain/propulsion unit of the vehicle.

It is an object of the invention to utilize intelligence based load shedding to protect powertrain components.

It is another object of the invention to provide microprocessor control over both analogue and digital electrical devices in a vehicle's electrical system.

It is another object of the invention to provide power coordination among the "dumb" and "smart" devices and their electrical/electronic systems of a vehicle.

These and other objects are met by the apparatus disclosed herein that provides load prioritization, load shedding, start sequencing and support of ultra or super capacitors, batteries or fuels cells when coupled to the motor vehicle's electrical power source and distribution network. The apparatus includes circuit breakers, solid state relays, controller area network (CAN) physical, transport and logical interface which enable the apparatus to connect or interface with power sources and to the vehicle's multiplex bus. The apparatus also includes decision threshold detection and operational awareness logical software functions that enable it to prioritize power between the vehicles electrical components and interrogative/processing software functions that enable the apparatus to diagnosis abnormalities and communication status information to the vehicle operator. Lastly, the apparatus includes DC converters, temperature compensation circuitry, solid state relays, logic drivers and software functions that allow load shedding and temperature compensation to maintain efficient operation of the power source.

More specifically, the apparatus includes a motherboard connected to a microprocessor chip (computer chip), with the motherboard having connectors for the digital, analogue and electronic ("smart") device's wiring harnesses (the "pigtails"). The motherboard is attached to multiple solid state relay (high impedance or optically isolated) triggers that can be configured to handle (switch on and off and otherwise regulate) electrical power to various voltage loads of the vehicle. The motherboard and relays are enclosed in a housing that allows for the connection of the various digital, analogue and electronic ("smart") device's wiring harnesses (the "pigtails") to the motherboard connectors.

The apparatus is designed to manage three electrical load levels for the operation of the vehicle's electrical/electronic system: 1) start-up control, 2) electrical load management and 3) electrical load shedding. During the start-up control level, the invention senses that the vehicle's propulsion unit or powertrain is off and that the vehicle operator is signaling that he/she wants it to be turned on. The apparatus then checks that the status of vehicle's electrical/electronic systems. The invention then turns off or de-energizes all those electrical/electronic devices and systems (both "smart" and "dumb") which are not needed to initiate/start the propulsion unit or the powertrain of the vehicle, or sets them to minimal energy requirements. In this manner, all the electrical energy necessary for starting and running the vehicle's power source/storage can be obtained from the vehicle's electrical power generation unit and/or electrical power storage device(s). The invention then powers up the propulsion unit or powertrain. Additionally the device will sequence power sources as necessary for a repeatable/reliable startup. For instance, a Capacitor and Battery arrangement could be configured such that the capacitor power source is used to start the starting motor and the battery will be used to sustain cranking until the ICE acheives idle operations.

During the electrical load management level, the apparatus monitors the status and electrical activity of the vehicle's various respective electronic/electrical devices and systems and the electrical power is available to power them. The system will then annunciate out of tolerance conditions to the vehicle operator who can, at his or her valition, take preemptive steps to critical shutdown of power systems.

During the load-shedding management level, the apparatus uses the information obtained from electrical load management, and automatically (i.e. without vehicle operator intervention) prioritizes which electronic/electrical devices or systems are turned on or off and according to task or need at hand.

Using the three above described levels, the apparatus assures that there is enough energy in the vehicle's electrical power/storage to start the propulsion unit or powertrain or if there is an electrical problem with the vehicle to ensure that the propulsions unit or powertrain receives sufficient electrical energy to ensure that the vehicle has the mobility to travel toward desired a destination (such as to obtain repairs).

DESCRIPTION OF THE PREFERRED EMBODIMENT(S)

Figure 1:
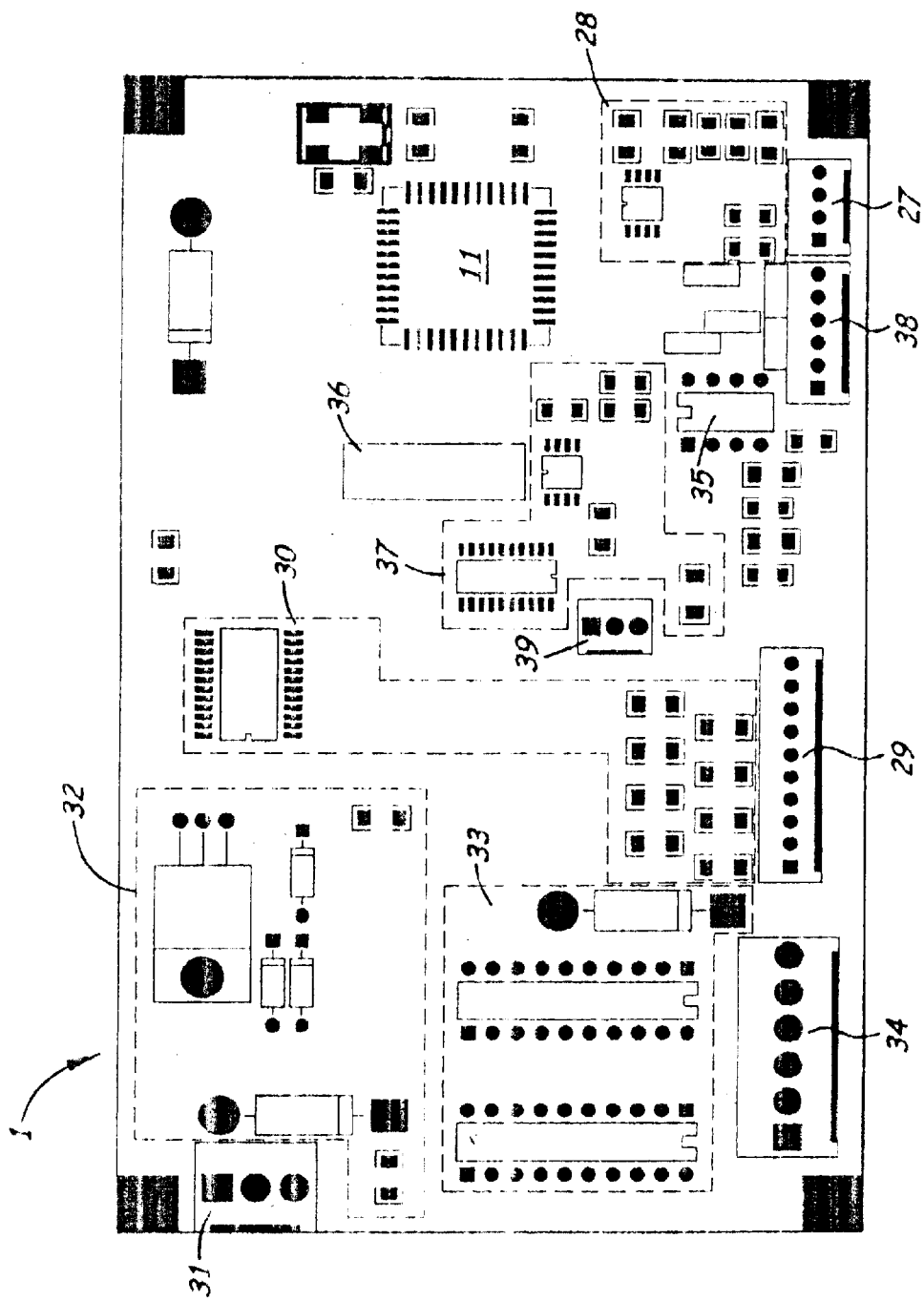
FIG. 1 is a block schematic of the apparatus.
Figure 2:
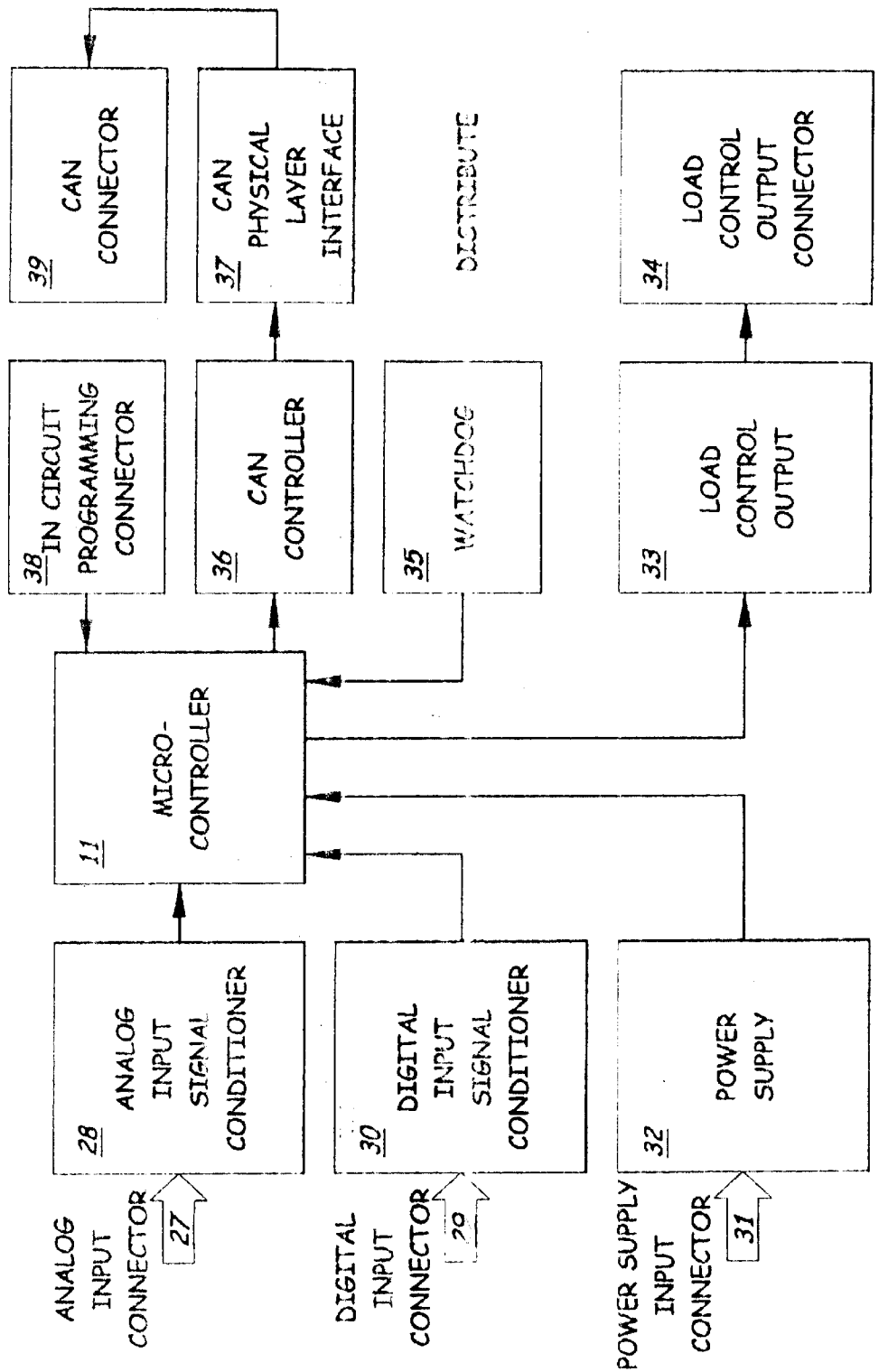
FIG. 2 is a detailed block diagram of the apparatus.

The invention, generally denoted by numeral 1, integrates the current amalgam of vehicular "dumb" (analogue and digital) electrical devices/systems and the "smart" (in the preferred embodiment SAE J1939) electronic devices/systems to manage and control the supply of electricity from the vehicle's electrical power storage/supply to the vehicle's various "dumb" and "smart" electronic/electrical devices and systems. The apparatus controls three basic aspects of electrical system: 1) powertrain/start management, 2) electrical load management, and 3) electrical load shedding to the electronic/electrical systems of the vehicle. The apparatus 1 monitors the current, voltage and temperature of the vehicle's electrical power supply/storage system. If the apparatus 1 determines that one or more operating parameters of that system have been transgressed, it will automatically annunciate the condition to the operator, then shut down some or all electrical power to the various electrical/electronic systems of the vehicle in order to conserve the electrical power being made and/or stored by the vehicle.

The apparatus 1 prioritizes the vehicle's electrical systems and devices so that there is sufficient electrical power to start and operate the vehicle. In the preferred embodiment, where the vehicle uses an internal combustion engine (hereinafter called an ICE) for propulsion unit or powertrain, the ICE has electrical devices that need to be energized for the ICE to start and operate (e.g., starter motor, ignition system, fuel injectors, electronically controlled transmissions). Such a propulsion unit or powertrain requires a minimum amount of electrical power to initialize or "turn-on" and operate the powertrain for propulsion. If the vehicle's electrical power drops below the level needed to initialize or turn on or to run the powertrain, then the vehicle becomes immobile until the operator obtains a secondary electrical power source to charge the vehicle's electrical system.

Since the apparatus 1 can be programmed to react to operator designated operating parameters 30 regarding the current, voltage and temperature of the vehicle's electrical power supply/storage system, the apparatus 1 can be used with any type of electrical power supply/storage system used by the vehicle. In the preferred embodiment, the apparatus 1 is used with a vehicle whose electrical power supply/storage system is a standard alternator-battery electrical power supply. It should be understood, however, that the apparatus 1 can be adapted for use with a wide variety of present and future vehicle electrical power systems.

In alternative embodiments, the apparatus 1 is used in a vehicle with a non-ICE powertrain or propulsion unit. In the event of an unacceptable power drain of the vehicle's electrical system, the apparatus 1, in monitoring the vehicle's electrical/electronic system, would shut down all unnecessary or non-essential electrical or electronic devices and subsystems in priority to eliminate or slow down the power drain to ensure that sufficient electrical power was supplied to those electrical/electronic devices and subsystems needed for the mobility of the vehicle.

As shown in FIG. 1., the apparatus 1 of: a standard configured fiberboard motherboard 10 supporting CPU (computer processing unit) microchip (16F877) 11; connected to eight (8) solid state relay triggers 12 (mosfet type National LMD 18400); one SAE J1939 electrical interface connector 13 (for the transmission of J1939 serial stream messages monitoring/informing of the status of electronic/electrical devices/systems to a "smart" type display panel or another diagnostic device); a set of connectors (for connection to analogue and digital "dumb" electrical sensors)14; and a set of power leads 15 for powering the CPU and related circuitry. All of these elements are contained within a shockproof standardized electrical outer box.

The preferred embodiment of the apparatus 1, is used in a heavy duty (commercial/military), wheeled vehicle with electrical/electronic system that operates on one or more different voltages and has a blackout operational mode wherein the lights and displays of the vehicle are kept dim or turned off. This specialized blackout operational mode runs independently of the operation of the vehicle's powertrain. In an alternative embodiment for another commercial setting, the apparatus' computerized parameters could be altered to accommodate the vehicle in such a mode that would always have the warning lights/anti-collision lights illuminated regardless of whether or not the vehicle's powertrain were operational.

The different voltages, as used in the preferred embodiment vehicle's electrical system, allow the lower voltage powering of the low voltage electrical/electronic accessories of the vehicle, while the other higher electrical voltage power is used for the running of very heavy-duty electrical/electronic peripherals attached or connected to the vehicle. Such very heavy-duty electrical peripherals could include powerful communication devices, large refrigeration units, machinery and the like.

As such, as shown in FIG. 1, the apparatus 1 has two power leads, one for 12 volts 16 and one for 24 volts 17. In an alternative embodiment, such as the automotive passenger vehicle, all of electronic/electrical devices of that vehicle would only run off of the 12 volt or 42 volt power source.

In the preferred embodiment, the apparatus 1 has an input sensor, the ignition switch (IGN SW) 18, which when activated informs the invention 1 that the vehicle operator is activating or turning on the powertrain or/propulsion unit. Unlike passenger vehicles, which have a single key switch to turn on both power to the vehicle and start the vehicle's powertrain, heavy-duty commercial/military vehicles have two separate switches. One switch, generally a key switch, is used to turn-on the electrical power in the vehicle. Another separate switch is then used to connect the electrical power to the electrical/electronic devices of the vehicle's powertrain/propulsion unit needed to start and run the powertrain/propulsion unit.

Other inputs include the blackout operation switch 19 and the engine running sensor 20. Engine running sensor 20 which informs the apparatus 1 that powertrain is operational (running). In the case of an ICE powered vehicle, the oil pressure sensor of the ICE acts as the engine running sensor 20. Normally, in an ICE there is found an oil pump which pushes oil through the ICE to lubricate the critical moving parts of the ICE when the ICE is operational. Therefore, when an engine oil sensor in the ICE detects oil pressure created by the oil pump, the sensor informs the CPU microchip 11 that the ICE is running.

In the preferred embodiment, the blackout operation switch 19 informs CPU microchip 11 that the vehicle operator has selected the vehicle's electrical system to run in "a lights out" capacity.

As discussed above, alternative embodiments of the apparatus 1 could be applied to various vehicles having various "smart" and "dumb" electronic/electrical devices that have different types of operation modes requiring different or additional input sensors.

The apparatus 1 also has SAE J1939 electrical interface connector 13 (J1938 bus) to allow the invention 1 to receive and process serial stream messages from various J1939 "smart" devices on the vehicles "smart" network and to send status serial stream to a "smart" display panel or other diagnostic device. SAE J1939 is the electronic "smart" standard for commercial and military vehicles.

The apparatus' various solid state relay triggers 12 control the supply of electrical power from the power leads (12 and 24 volt) 15 to various electrical/electronic aspects of the vehicle. These various electrical/electronic aspects can be broken down into three groups in the preferred embodiment: powertrain rely control 21, aux load relay control 22, and lighting control 23. As with the input sensors, the solid state relay triggers 12 could control additional, as well as different, electronic/electrical operations of the particular vehicle.

Powertrain relay control 21 has solid state relay triggers 12 that control the electrical power from the power leads 15 to the vehicle's powertrain/propulsion unit and its electrical components. The lighting control 23 has solid state relay triggers 12 controlling the illumination devices and visual displays of the vehicle. The aux load relay control 22 has solid state relay triggers 12 controlling the power to those electrical/electronic devices that are not used in the propulsion or movement control of the vehicle.

Two system status indicators 24, error 25 and low volt 26, are displayed to vehicle operator via the use of LED or other type of light signals situated on the vehicle display panel. These system status indicators 24 communicate relevant information or other data from the CPU microchip 11 to the vehicle operator or maintenance personnel. During initialization of the invention 1, both system status indicators 24 go on momentarily so that the vehicle operator will know that the two lights are working properly and have not burned out.

If the low volt 26 signal is activated, the apparatus 1 has detected that the vehicle's overall electrical power level has dropped to and/or below a preset parameter/threshold level.

When the vehicle's overall power level has dropped below a second parameter, which is set 5 critically close to the level of power at which the electrical system can not initiate or start the powertrain/propulsion unit, the error LED 25 is activated on the display panel to inform the vehicle operator of this serious condition. This error LED 25 informs the vehicle operator, when the vehicle's powertrain/propulsion unit is engaged and running, that the vehicle has a failure in its electrical/electronic system in that it is unable to replenish electric power that is being consumed during vehicle operation. When the powertrain/propulsion unit is not operational, the activation of the error LED 25 informs the vehicle operator that the powertrain or electrical generation device should be activated, to replenish the electrical power consumed by the vehicle. When the apparatus 1 activates the error LED 25 will also automatically commence electrical load shedding in order to conserve the supply/generation of the vehicle's electrical power either for starting the vehicle's powertrain/propulsion unit or for maintaining an adequate supply of electrical power to the electrical/electronic devices of vehicle's powertrain/propulsion unit to ensure powertrain/propulsion unit operation and vehicle mobility.

As shown in FIG. 1, the motherboard 11 has an analogue input connector(s) 27 which is the 20 physical connection of the pigtails (wire harness) from analogue "dumb' sensors. These analogue input connectors 27 run into the analogue input signal conditioner 28 which take the analogue signal from the sensor(s), reduces its voltage (so the CPU microchip 11 will not be burned out when the analogue sensor signal is sent to it) and coverts the analogue input signal into a format that the CPU microchip 11 can read and process.

The digital input connector(s) 29 and digital input signal conditioner 30 both accomplish the same objective for digital sensor signals.

The power supply input connector 31 has the power leads 15, the 12 volt power lead 16 and 24 30 volt power lead 17 which connect to the power supply 32. The power supply 32 supplies electrical power to the CPU microchip 11 (and associated circuitry) and to the solid state relay triggers 12. The solid state relay triggers 12 are operated by the load control output 33 which is in turned controlled by the CPU microchip 11. In this manner, the CPU microchip 11 determines which of the vehicle's various electrical/electronic devices/systems gets electrical power.

The CPU microchip 11 is also connected to a watchdog circuit 35 that resets the CPU microchip 11 should its programming freeze. During regular intervals of the operation of the program, (e.g., one ten thousand of a second), the watchdog circuit 35 oversees the activity of the CPU microchip 11 by monitoring the activity of the memory of the CPU microchip 11. This watchdog function is accomplished when the watchdog circuit 35 causes a signal to be sent to the chip's memory. The CPU microchip 11 must respond to this signal within a set time period. If the CPU microchip 11 and its software program are running properly, the CPU microchip 11 does timely respond to the signal and the watchdog circuit 35 does nothing except send out another signal to the memory of the CPU microchip 11 at preset intervals.

If, on the other hand, either CPU microchip 11 is malfunctioning or its software is not running properly (i.e., it is "frozen") or both, then the CPU microchip 11 will not timely respond to the signal initiated by the watchdog circuit 35. At that point, since it has not received the timely response from the CPU microchip 11, the watchdog circuit 35 goes to a preselected "page" of the CPU microchip its memory and inserts a preselected code or "number'. This "number" is called a "watchdog hit". The insertion of this "watchdog hit" in the memory of the CPU microchip 11 causes the software program of the CPU microchip 11 to restart or "reboot". Upon restarting or initializing, the software program looks for any "watchdog hit". If any "watchdog hits" are found in the memory of the CPU microchip, the software program undergoes a routine to send a warning signal to the vehicle operator that a fault has occurred and to establish what is the operational status of the vehicle. By establishing the vehicle's status, the software program does not get confused, such as trying to start the engine of the vehicle, if the engine was already running when the watchdog circuit 35 caused the software program to restart.

The CPU microchip 11 is also connected to the CAN controller 36 which is the CAN (Controller 30 Area Network) or J1939 interface. The circuitry of the CAN controller 36 provides the conversion of serial stream messages to/from those signals that the CPU microchip 11 can understand. The CAN physical layer interface 37 is connected to the CAN controller 36. This is where the CAN signals are converted to TTL level interfaces. The CAN physical layer interface 37 is connected to the CAN connector 39 which is the physical connector connecting the invention 1 to a J1939 wiring harness of the vehicle. The CAN portion of the invention 1 allows the invention 1 to process received status messages from J1939 "smart" devices and to send J1939 status messages to a "smart" type display panel or other type of diagnostic device.

The in-circuit programming connector 38 allow the operator to make changes to the software program such as setting the desired parameters of the voltage, current and amperage of the vehicle's power supply/storage system (including the parameters that trigger error 25 and low volt 26 LEDs, and the priority by which solid state relays triggers which operate in supplying power to the vehicle's electrical/electronic devices and systems). Normally, the setting of the parameters of thresholds occur when the vehicle is powered down (turned-off) but the invention 1 is still receiving power.

Although most of the circuitry components of the apparatus 1 are off-the-shelf, it is the invention's very compact software program that allows the invention to use a small power CPU microchip 11. This compactness allows the software program be stored in limited space of the memory of the CPU microchip 11. The software program is considered to be linear in that it does not reset to its initiation phase unless the CPU microchip is shut down and turned back on ("rebooted").

Figure 3:
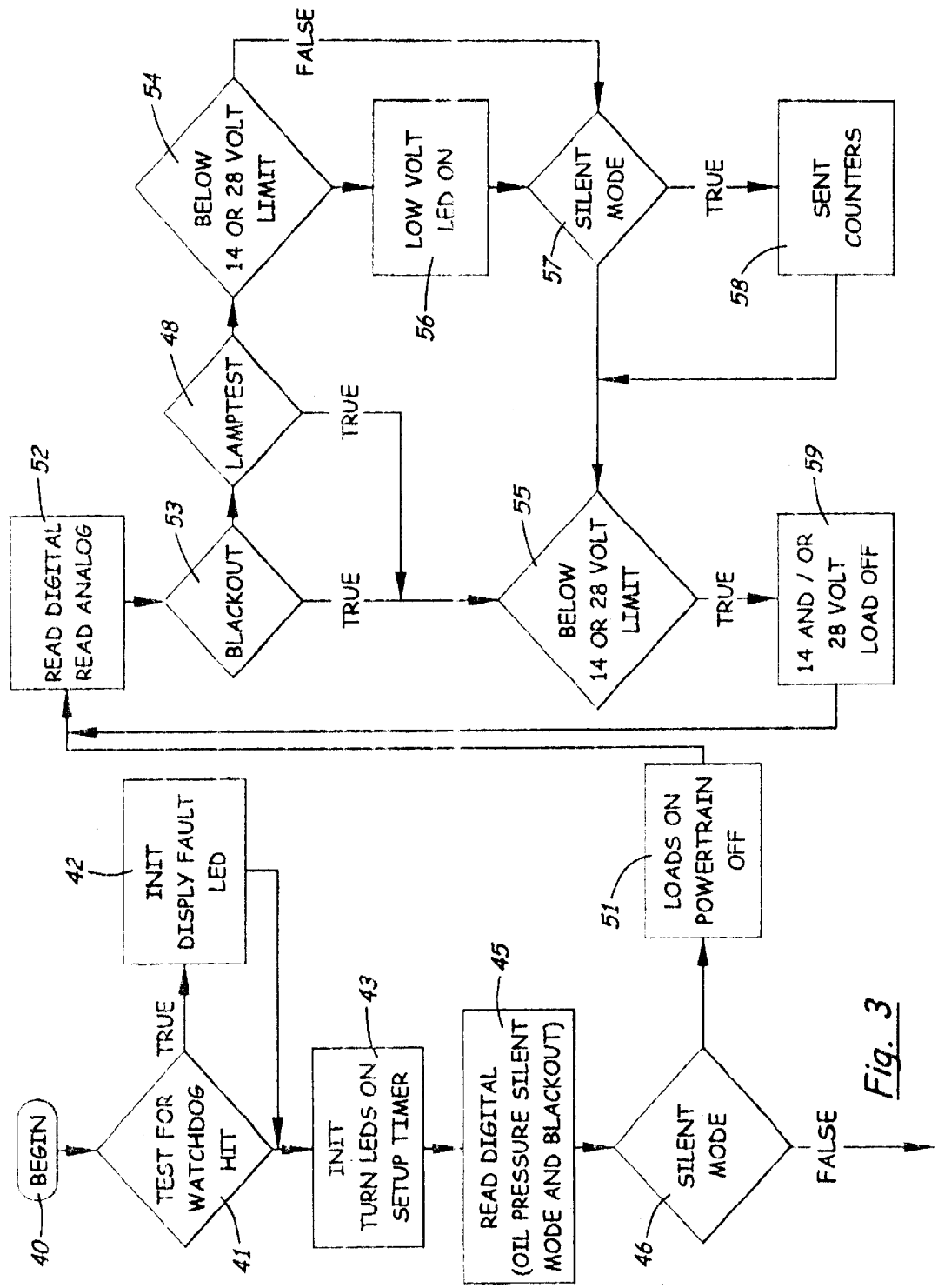
FIG. 3 is a block flow chart of the software program used by the apparatus.
Figure 3:
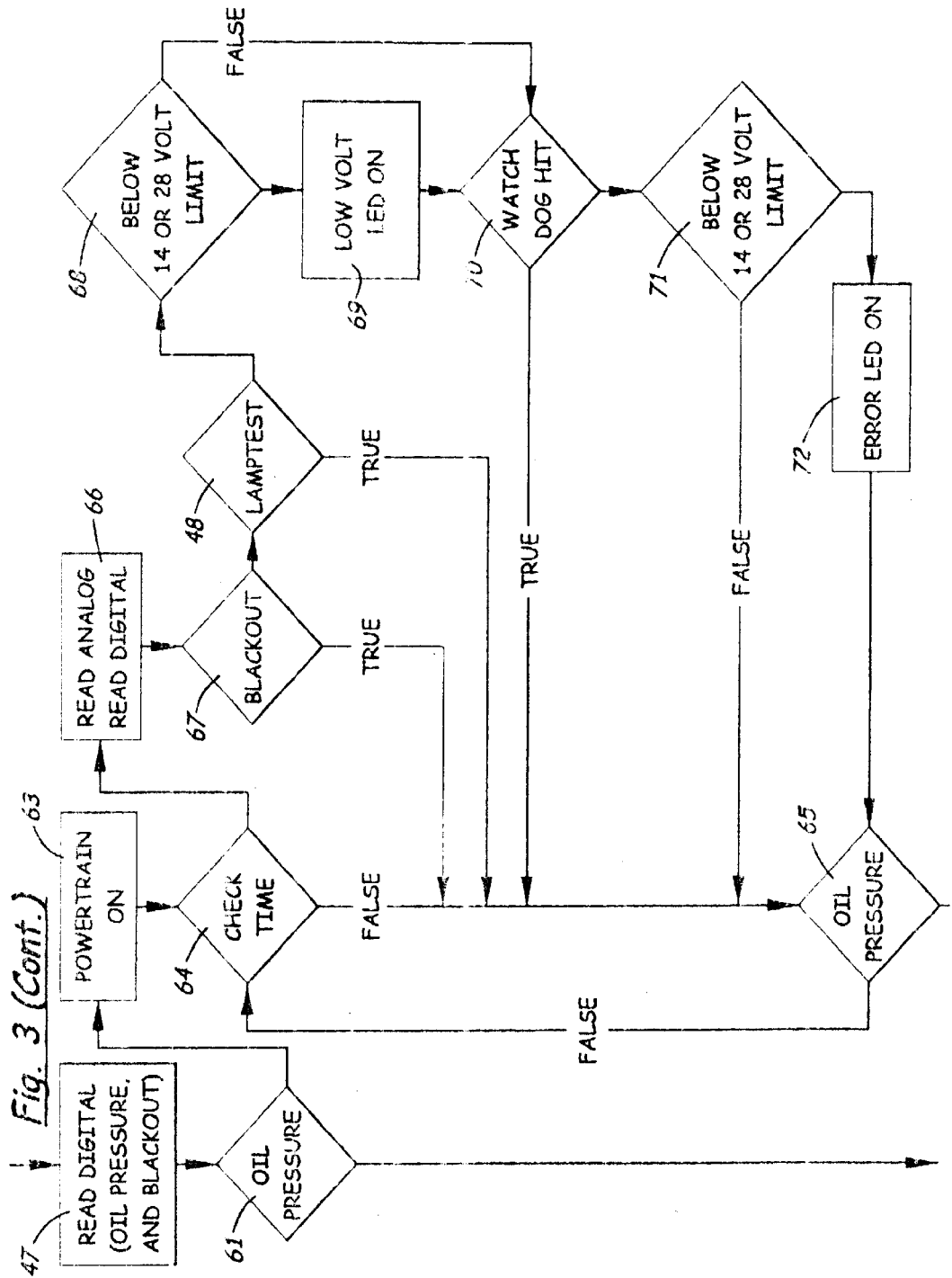
Figure 3:
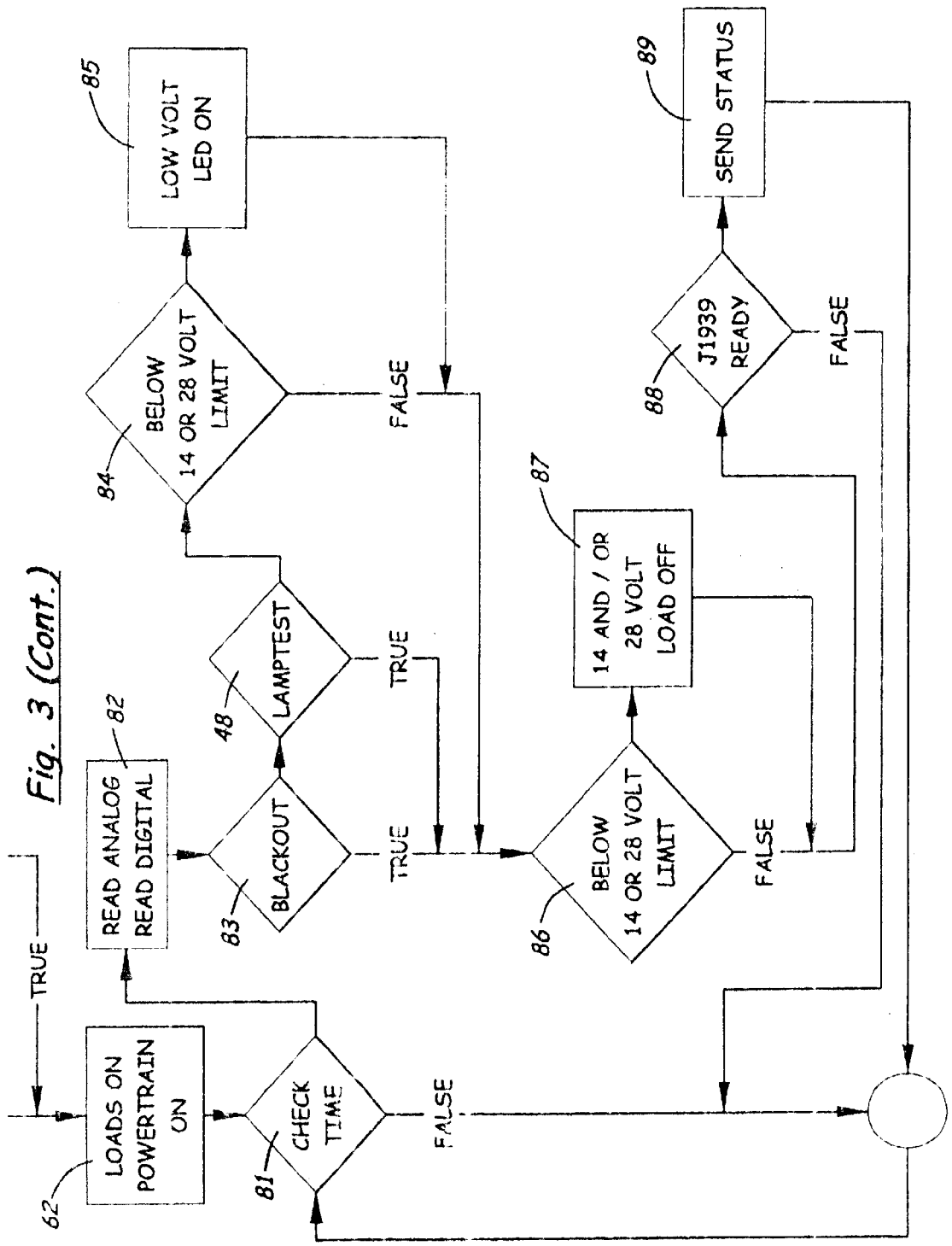

As shown in FIG. 3, the software program 101 used with the apparatus 1 that uses three subroutines: a Silent Watch Mode 50, a Start Engine Mode 60, and an Engine Running Mode 80. The software program will be in only one of these three subroutines at any given time.

The Silent Watch Mode subroutine 50 is the first subroutine that the software program 110 of the apparatus 1 can enter. This subroutine 50 is engaged when the vehicle is in an operating status whereby the vehicle's powertrain/propulsion unit is turned off and electrical power is supplied to the vehicle's electrical/electronic accessories (both "smart" and dumb") with the exception of those accessories needed to the run the vehicle's powertrain/propulsion unit. In this subroutine, the invention monitors the vehicle's level of electrical power to ensure that while the electrical accessories are being run, the vehicle will retain sufficient electrical power to start and operate the vehicle's powertrain/propulsion unit.

To accomplish this purpose, the apparatus 1 will warn the operator when the level of vehicle's electrical power is reaching the first preset critically low thresholds or parameters. Upon the reaching the second or the most critical of these thresholds, the apparatus 1 will automatically inform the vehicle operator of this situation and then automatically commences the prioritized shutdown (shedding) of operating electrical/electronic accessories. In this manner, the apparatus 1 allows the vehicle to conserve electrical power necessary to start and operate the powertrain/propulsion unit. The apparatus 1 can exit this subroutine when the vehicle's overall electrical/electronic system is shut off or software program is rebooted.

In the second subroutine Start Engine 60, the apparatus 1 has sensed that the 15 powertrain/propulsion unit is not running and that the vehicle operator wants to start it. In the preferred embodiment, the vehicle is fully turned off. The operator then turns on the electrical power to the vehicle and activates the vehicle powertrain/propulsion unit simultaneously. In this subroutine 60, the apparatus 1 only powers (through the activation of the appropriate solid state relay triggers) those electrical/electronic accessories that are related to the starting of the vehicle powertrain/propulsion unit. The apparatus 1 will also inform the vehicle operator of any electrical problems causing a drain of the vehicle's electrical power level (the reaching of the first and second preset critical thresholds) but will not engage in the shedding of power loads (that would maintain the level of electrical power for starting the vehicle's powertrain/propulsion unit). The apparatus 1 will leave the second subroutine Start Engine 60 when it senses the vehicle's powertrain/propulsion unit is operational.

The apparatus 1 will enter the third and final subroutine Engine Running 80 when the apparatus 1 senses that the power is being sent to electrical/electronic accessories and the powertrain/propulsion unit of the vehicle is operational. In this subroutine 80, the apparatus 1 will monitor the level of electrical power of the vehicle. If the level of electrical power drops below the first preset critical thresholds, the apparatus 1 will inform the vehicle operator of same.

If the electrical drain continues past the second preset critical threshold, the apparatus 1 then will automatically commence shedding of prioritized electrical loads. This shedding action ensures that the electrical/electronic accessories related to the mobility of the to enable the vehicle to travel towards a desired destination (e.g., a repair station).

Upon initiation of the software program 110 (i.e. the electrical power is supplied to power vehicle's electrical/electronic accessories or the software program 110 is rebooted), the first function for the software program 110 is BEGIN 40. During this power-up of the vehicle and invention, the software program 110 is retrieved from memory of the CPU microchip 11 and installed and run on the CPU microchip 11.

The software program 110 then executes Test for Watchdog Hit 41 decision. If there is a "watchdog hit" present in the memory of the CPU microchip 11 (indicating that the watchdog circuit 35 activated are start or "reboot" of the software program 110 due to a software program 110 or CPU microchip 11 problem), then the software program initiates the Init Display Fault LED 42 step whereby the CPU microchip 11 causes the illumination of an error LED 25 on the "smart" or analog display panel to inform the operator that the program "rebooted" due to program and/or CPU microchip malfunction. If there is "no watchdog hit" present, (or after lighting up the error LED), then the software program 110 proceeds to the next function Init Turn on LEDS on Setup Timer 43.

At this function, the software program 110 momentarily turns on the both error 25 and low volt 26 lights, so the vehicle operator will know if either or both of the error 25 or low volt 26 are burnt out. The software program 110 then initializes the timers that are used to check on the current and voltage levels of the vehicle's electrical system. After completing these tasks, the software program 110 then moves onto the Read Digital (oil Pressure, Silent Mode and Blackout) 45 function.

At this function or step, the software program 110, in the preferred embodiment, is reading three separate and independent digital signal inputs from the vehicle. In the preferred embodiment, the oil pressure signal input indicates whether or not the ICE powertrain of the vehicle is running. The Blackout (blackout mode signal input) indicates whether the operator has activated a special electrical mode for the vehicle whereby the lights on the vehicle and vehicle visual displays are dimmed or deactivated. The silent mode or silent watch mode indicates the vehicle operation where the vehicle powertrain is off in that there is no electricity being supplied to the powertrain for its operation (i.e., the engine is not running) and only electrical accessories are running.

The software program 110 then proceeds to the silent watch mode 46 decision. If the vehicle is not in the silent watch mode, the software program proceeds to Read Digital (Oil Pressure and Blackout) 47 function. If the vehicle is in a silent watch mode, it goes into the silent mode subroutine, generally referenced by numeral 50. In this silent watch mode subroutine 50, the software program is essentially continuously checking the amount of electricity that is powering the electrical/electronic devices of the vehicle that are running while the powertrain or other electrical generation units are turned off. This subroutine 50 automatically ensures that the energy storage units (i.e., the batteries and the like) are not drained to the point that they are unable start or drive the vehicle's powertrain or propulsion unit. When the electrical power drops past a certain previously set parameter, the silent watch mode subroutine 50 warns the vehicle operator and begins to automatically shut down various electrical/electronic devices to preserve sufficient electrical power to turn on the vehicle's powertrain or propulsion unit.

When the software program 110 enters the silent watch mode subroutine 50, it proceeds to the Ignition On Powertrain Off 51 function (whereby the vehicle's engine is turned off but the ignition is turned to run electrical accessories on).

In a passenger vehicle, the ignition switch is generally a key operated, multi-position switch located usually on the steering column. This ignition switch has at least three positions: "off", "electrical accessories on" and "momentary start". The momentary start is what turns over and starts the vehicle's engine. After the engine starts, the operator then releases the key, which falls back to the "accessories on" position for operation of the vehicle.

However, in commercial vehicle and military vehicles, the key switch only turns on electricity to 30 all of the electrical/electronic system of the vehicle except the starter device for the ICE. A separate switch controls the starter device. In the preferred embodiment of the invention, the vehicle has such a set-up for a separate ICE starter switch.

After completing the Ignition On Powertrain Off 51 function, the software program 110 then goes to 5 the Read Digital Read Analogue 52 function. At this function, the software program checks the input signal(s) from the analogue and digital (i.e. "dumb") sensors. The software program 110 then proceeds to the Blackout 53 decision. If the software program 110 senses that the vehicle is not in a blackout mode, it proceeds to the first Below 14 or 28 Volt Limit 54 decision. If the analogue and digital input signals indicate a blackout mode (activated by the operator), then the software program 110 proceeds to the second Below 14 or 28 Volt Limit 55 decision.

The first Below 14 or 28 Volt Limit decision 54 is to warn the vehicle operator if electrical power supply is running low. Here, at a silent watch mode but not blackout mode, the software program will check, in the preferred embodiment, the electricity levels (amount of voltage and current) of the 12 and 24 volt electrical systems of the vehicle. If either or both the 12 volt and 24 volt electrical systems have electricity levels below a preset point (i.e., the power level has dropped below the preset critical threshold or parameter) then the software program goes to the Low Volt LED On 56 function. This is where the program turns on the "low volt" LED 26 to warn the vehicle operator that the power level (i.e., the batteries) of the electrical system is running low.

If both electrical systems (12 and 24 volt) have adequate electricity levels (e.g., the vehicle battery are not being drained to a level exceeding the first preset critical threshold or parameter) or after turning on the low volt 26 LED, the software program then proceeds to a Silent Mode 57 25 decision.

If the software program 110 detects that the vehicle is operating in a silent watch mode (e.g. no oil pressure), the software program then proceeds to Sent Counters 58 function. At this function, as a diagnostic aid for wear/tear and maintenance management (i.e., battery replacement), the software program 110 activates the error 25 light in a sequence to inform the vehicle operator, as a diagnostic aid, as to indicate what portion of the vehicle's lifetime has been spent in silent watch mode. Once the Sent Counters 58 function has been completed, it shall not be reinitialized unless the invention 1 has been rebooted or turned off and then restarted.

If the vehicle is not in silent watch mode, or after sending the diagnostic signal from the Sent 5 Counter 58 function, the software program 110 progresses to the second Below 14 or 28 Volt Limit 55 decision. If the electricity levels have fallen below the second preset critical threshold or parameter (i.e., the electricity power levels is so low that the vehicle's powertrain/propulsion unit can not be started) the software program 110 then goes to the 14 and/or 28 Volt Load Shut Off 59 function. Here the software program, in order to preserve and/or restore the electrical power level of the vehicle will, as a fail-safe mechanism, automatically start shutting off in preset priority various prioritized electrical/electronic accessories or loads. In this manner, regardless of whether or not the operator will take the some type of action after seeing the low volt light 26 go on, the software program 110 automatically takes action to conserve sufficient electrical power to ensure that the vehicle will have enough electrical power to start the ICE or other electrical generation unit of the vehicle that would replenish the energy storage devices. Although the load shedding will occur, there will be no activation of the error 25 LED.

If the electrical power level for the vehicle's electrical/electronic systems are above their minimum levels or after the program has shut down devices to keep the electrical levels above their minimal thresholds, then this silent watch subroutine 50 recycles back to the Read Digital Read Analogue 52 function. This recycling occurs until the vehicle, and hence the software program, is shut down or the watchdog circuit 35 causes a "reboot" of the software program 110.

As stated above, if the software program 110 has not entered the first or silent watch mode subroutine 50 because the vehicle is not operating in silent watch mode, the software program 110 will go to Read Digital (oil pressure and Blackout) 47 function to check the digital inputs for oil pressure and blackout. If the oil pressure input signal indicates no oil pressure or that the powertrain is off, the software program enters the second or Start Engine subroutine generally referred to as numeral 50. To get to this subroutine, the software program 110 has identified that the vehicle that the engine is not running and that vehicle operator has simultaneously activated switches for starting the vehicle's powertrain and turning on the electrical power supply.

At Oil Pressure decision 61, if the oil pressure level is high to indicate that the vehicle power plant is running (e.g., the vehicle is not in silent mode), then the software program then bypasses the Start Engine 60 subroutine and proceeds to the Ignition On Powertrain On 62 function.

If there is no oil pressure at Oil Pressure decision 61, then the software program proceeds to the Engine Start subroutine 60. The software program 110 will stay within this second subroutine until the operator starts the powertrain by using the separate start button.

The first function of the second or Engine Start subroutine 60 is Powertrain On 63 function. Here the software program 110 supplies electrical power to all the electrical/electronic accessories devices of the powertrain/propulsion unit, except the starter device for the powertrain/propulsion unit (e.g., the operator is the only one who can activate the starter device).

After this function is completed, the software program 110 then proceeds to the Check Time 64 decision. The software program 110 checks the number of times that it last sent/read the analogue or digital input or output (diagnostic) signals. If the software program 110 has read the analogue/ digital inputs recently, the software program 110 proceeds directly to the last decision of the Engine Start subroutine 60, the second Oil Pressure 65 decision. This final decision of this Engine Start subroutine 60 checks to see if the vehicle's powertrain/propulsion unit is operating. If the powertrain/propulsion unit is running (there is oil pressure), then the software program exits the Engine Start subroutine 60 and goes on to the Ignition On Powertrain On 62 function. If the powertrain/propulsion unit is not operational (no oil pressure) then the software program stays within the Engine Start subroutine 60 and recycles back to the Check Time 64 decision.

If at the Check Time 64 decision, the software program 110 has not recently read the analogue/digital inputs, the software program goes to the Read Analogue Read Digital 66 function. There the software program 110 causes the CPU microchip 11 to read the analogue and digital inputs. The program then goes to blackout 67 decision.

At the blackout 67 decision, the software program 110, utilizing data from the recently read analogue and digital, decides whether or not the vehicle is running in a blackout mode (e.g., sensed that activation of the blackout switch by the operator). If the vehicle is running in a blackout mode, then the software program goes directly to the last decision of this subroutine second Oil Pressure 65 (to decide whether or not the powertrain or engine is running). If at the blackout 67 decision, the vehicle is not running in the blackout mode, the software program 110 then proceeds to that portion of the Engine Start subroutine 60 wherein the software program 110 checks the vehicle's electrical power levels. The first section of this portion of the Engine Start subroutine 60 is the first of two Below 12 or 24 Volt Limit decisions.

At the first Below 12 or 24 Volt Limit 68 decision, the software program 110 checks the analogue and digital data to see if the power levels of the vehicle's overall electrical system are low by exceeding the first preset critical threshold or parameter for either or both of the 12 and/or 24 volt systems. If this threshold for either or both of the 12 and/or 24 volt systems is exceeded, then the software program goes to Low Volt LED On 69 function. There the software program 110 illuminates the low volt LED 26 to inform the vehicle operator that the power levels of the vehicle's overall electrical system is getting low. If this first preset critical threshold or parameter for either or both of the 12 and/or 24 volt systems is not exceeded, or if after the low volt LED 26 has been turned on, then the software program goes to the watchdog hit 70 decision.

At the watchdog hit 70 decision, the software program 110 has the CPU microchip 11 check its memory to see if a preselected code has been inserted at a preselected page by the watchdog circuit 35 (thus indicating that the software program was rebooted or restarted by the watchdog circuit 35). If the watchdog circuit 35 did cause a reboot of the software program 110, then the software program 110 proceeds to the last decision of the Start Engine subroutine 60, second Oil Pressure 65. If the watchdog circuit 35 did not cause a reboot of the software program 110, then the program goes to second Below 12 or 24 Volt Limit 71.

At the second Below 12 or 24 Volt Limit decision 71, the software program 110 checks, based on digital and analogue data, whether the power level of the vehicle's electrical system (either the 12 or the 24 voltage, or both) has reached a second set parameter (second critical preselected threshold). As stated above in the description of the first subroutine, silent watch mode 50, this second preset critical threshold or parameter is just above the minimum amount of power needed to start or activate the vehicle's powertrain. If this threshold for either or both of the 12 and/or 24 volt systems has been exceeded, the program goes to error LED on 72 function to illuminate the error LED 25 on the display panel to warn the operator that there is a serious power depletion problem with either or both of the 12 and/or 24 volt systems. The program 110, however, warns the operator, but does not commence any load shedding or powering down of any electrical accessories at this time.

If the second preset critical threshold for either or both of the 12 and/or 24 volt systems is not exceeded or after the program has illuminated the error LED 25, the software program 110 then goes to the last decision of the Engine Start subroutine 70, the second Oil Pressure 65. If the vehicle's powertrain/propulsion unit starts during this second or Engine Start subroutine 60, then the rise in oil pressure caused by the operating powertrain/propulsion unit will allow the software program to exit this second subroutine Engine Start 70. Otherwise only turning off the vehicle or the watchdog circuit 35 "rebooting" of the software program will take the software program 110 out of the subroutine.

If the software program 110 did not go into the first subroutine silent watch mode 50 or did not go in (or did go into and completed) the second subroutine Start Engine 60, then the software program goes to the Function Ignition On and Powertrain On 62 function. At this function, the software program 110 insures that electrical power is being supplied to the powertrain devices and the operator activated electrical/electronic accessories.

After completing the Function Ignition On and Powertrain 62 function, the software program 110 proceeds to the last of the three subroutines, Engine Running, generally referenced by numeral 80. The first decision of Engine Running subroutine 80 is Check Time 81. The software program checks if it has recently checked the analogue and digital inputs. If it has not recently checked the analogue and digital data inputs, then the software program waits until its timers inform it that it is time again to check the analogue and digital data inputs.

If the software program 110 has recently checked the analogue and digital data inputs, then the software proceeds to a Read Analogue Read Digital 82 function, where it does so. After completing that function, the program proceeds to a blackout 83 decision. There the software program decides whether or not the operator has placed the vehicle into a blackout mode of operation. If the blackout condition exists, then the program proceeds to the first (of two) below 12 or 24 Volt Limit 84 decisions.

This first below 12 or 24 Volt Limit 84 decisions decision determines if the electrical power of the vehicle's electrical system is getting low by moving below the first preset threshold or parameter. If the power level has fallen below this first preset critical threshold or parameter for either or both of the 12 and/or 24 volt systems, then the software program goes to the Low Volt LED On 85 to illuminate an low volt 25 LED to inform the operator of a serious electrical power depletion problem. (E.g. this problem would that despite the operation of the powertrain/propulsion unit or other electrical generation unit, the vehicle is not producing sufficient electricity to meet its electrical/electronic needs (i.e., replenishing the batteries, powering the powertrain's electrical devices, powering the vehicle's electrical accessories, etc.). If the vehicle's electrical power level has not fallen below the first preset threshold or parameter) or if it has and after the error 25 light or LED has been turned on, then software program 110 proceeds directly to the second below 12 or 24 Volt Limit 86 decision.

At this second below 12 or 24 Volt Limit 86 decision, the software program 110 determines if the power level of the vehicle's electrical/electronic system has fallen below the second preset critical threshold or parameter for either or both of the 12 and/or 24 volt systems. If the power level has fallen below this second critical preselected threshold then, the software program goes to the 12 and/or 24 Volt Load Off 87 function and starts shutting off (shedding), in preset priority, power to all electrical/electronic devices except to those needed to operate the powertrain and control the movement of the vehicle. This ensures that the vehicle operator, once notified by the error 25, could continue to operate and move the vehicle to a place of repair. The program does not activate an error 25 LED or light.

If after completing the 14 and/or 28 Volt Load Off 87 function or if the power level had not fallen below second critical preselected threshold for either or both of the 12 and/or 24 volt systems, the software program proceeds to the J1939 Ready 88 decision. At that decision, the software program ascertains if it has received any J1939 messages from the "smart" devices and if it has any digital and analogue input signals converted into J1939 messages ready to be sent to the "smart" display panel or other diagnostic device. If there are J1939 serial stream messages ready to be sent, then software program proceeds to the Send Status 89 function whereby J1939 messages are sent to "smart" display panel or other diagnostic device.

After sending the status messages or if there are no status messages to be sent the software program recycles to the first decision, Check Time 81, of the Engine Running subroutine.

The software program will continue to recycle through the third Engine Running subroutine 80 until the vehicle's electrical system is turned off or the watchdog circuit 35 causes a "reboot" of the program.

While these descriptions directly describe the above embodiments, it is understood that those skilled in the art may conceive modifications and/or variations to the specific embodiments shown and described herein. Any such modifications or variations that fall within the parameters of this description are intended to be included therein as well. It is understood that the description herein is intended to be illustrative only and is not intended to be imitative.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An apparatus for controlling the electrical systems in a vehicle, comprising:
   a. a motherboard;
   b. means for connecting said motherboard to at least two electrical components in a vehicle;
   c. a microprocessor connected to said motherboard; and,
   d. a software program used by said microprocessor to monitor the electrical requirements and prioritize the distribution of electrical power to said electrical components to maintain efficient operation of a vehicle.

2. The apparatus as recited in claim 1, wherein said means for connecting said motherboard to at least two electrical components consists of at least one of the following groups: an analog connector and digital connector.

3. The apparatus as recited in claim 1, further including a controller area network connector connected to said motherboard.

4. The apparatus as recited in claim 1, wherein said means for connecting said motherboard to at least two electrical components is a connector used to connect to a wire harness used on a vehicle.

5. The apparatus as recite in claim 4, wherein said wire harness segregates the electrical components into electrical and electronic networks.

6. The apparatus as recited in claim 1, further including means for converting the electrical signals from said electrical components into a digital signal capable of being used by said microprocessor.

7. The apparatus as recited in claim 1, further including means for adjusting the voltage and amperage of the electrical signals from said electrical components for processing by said microprocessor.

8. The apparatus as recited in claim 1, further including relays connected to said motherboard and operated by said microprocessor for controlling the distribution of electrical power.

9. The apparatus as recited in claim 1, wherein said relays are controlled by said software program.

10. An apparatus for controlling the electrical systems in a vehicle, comprising:
    a. a motherboard;
    b. means for connecting said motherboard to at least two electrical components in a vehicle;
    c. a microprocessor connected to said motherboard;
    d. at least one circuit breaker connected to said motherboard;
    e. at least one relay connected to said motherboard;
    f. a controller area network interface; and,
    g. a software program used by said microprocessor to monitor the electrical requirements and prioritize the distribution of electrical power to said electrical components to maintain efficient operation of a vehicle.

11. The apparatus as recited in claim 10, further including means for load shedding and temperature compensation to maintain efficient operation of the electrical power source of a vehicle.

12. The apparatus as recited in claim 10, further including means for diagnosing abnormalities in a electrical power source of a vehicle.

13. The apparatus as recited in claim 10, further including means for communicating status information regarding the electrical power source of a vehicle to an operator.

* * * * *